United States Patent
Sugimoto et al.

(10) Patent No.: US 6,235,399 B1
(45) Date of Patent: May 22, 2001

(54) RESIN-COATED METAL SHEET WITH HIGHER VIVID REFLECTIVITY HAVING THE EXCELLENT WORKABLE ADHESION STRENGTH

(75) Inventors: Yoshiyuki Sugimoto; Takashi Minamigi, both of Hikarishi; Tetsuo Nakamoto, Kumagegun, all of (JP)

(73) Assignee: Toyo Kohan Co., Ltd., Tokyo (JP)

( * ) Notice: Subject to any disclaimer, the term of this patent is extended or adjusted under 35 U.S.C. 154(b) by 0 days.

(21) Appl. No.: 08/860,526

(22) PCT Filed: Dec. 22, 1995

(86) PCT No.: PCT/JP95/02639

§ 371 Date: Nov. 4, 1997

§ 102(e) Date: Nov. 4, 1997

(87) PCT Pub. No.: WO96/20828

PCT Pub. Date: Jul. 11, 1996

(30) Foreign Application Priority Data

Dec. 29, 1994 (JP) .................................... 6-338620

(51) Int. Cl.$^7$ .............................. B32B 5/16; B32B 27/08; B32B 27/32; B32B 27/36
(52) U.S. Cl. ........................ 428/458; 428/324; 428/328; 428/332; 428/461
(58) Field of Search .................................. 428/457, 458, 428/461, 480, 483, 500, 323, 325, 328, 332

(56) References Cited

U.S. PATENT DOCUMENTS

| | | | |
|---|---|---|---|
| 4,113,539 | * | 9/1978 | Hotta et al. .......................... 156/306 |
| 4,270,665 | * | 6/1981 | Kunimoto et al. ................... 215/347 |
| 4,330,353 | * | 5/1982 | Kunimoto et al. ................... 156/314 |
| 4,642,959 | * | 2/1987 | Sweich et al. ......................... 52/311 |
| 4,743,478 | * | 5/1988 | Pusch ..................................... 428/17 |
| 5,030,514 | * | 7/1991 | Hartman .............................. 428/363 |
| 5,079,052 | * | 1/1992 | Heyes et al. ....................... 428/35.3 |
| 5,242,751 | * | 9/1993 | Hartman .............................. 428/324 |
| 5,648,126 | * | 7/1997 | Kameya et al. .................... 427/536 |
| 5,670,261 | * | 9/1997 | Kameya et al. .................... 428/457 |

FOREIGN PATENT DOCUMENTS

| | | |
|---|---|---|
| 59-67048 | * 4/1984 | (JP) . |
| 3-281245 | * 12/1991 | (JP) . |
| 6-31881 | * 2/1994 | (JP) . |

* cited by examiner

*Primary Examiner*—Deborah Jones
*Assistant Examiner*—Michael LaVilla
(74) *Attorney, Agent, or Firm*—Browdy and Neimark

(57) ABSTRACT

In a resin-coated metal sheet, at least one surface of a metal sheet 10 as a base sheet is overlaid by a transparent polyester resin film A of 5 to 100 $\mu$m thickness through a paint layer E, a modified olefin resin layer D of 5 to 100 $\mu$m thickness, a pattern or/and solid printing layer C and an adhesive layer B which layers are put one over another in order from the side of the metal sheet toward the transparent polyester resin film. Since the modified olefin resin layer which is provided in between the transparent polyester resin film and the metal sheet has the excellent adhesiveness against the printing layer, the paint layer and the polyester resin film, even if the resin-coated metal sheet is formed under the severe condition against the resin-coated metal sheet, for instance, by deep drawing, delamination does not occur so that the excellent workable adhesion strength is shown. Further, the roughness of the surface of the metal sheet, and unevenness of several component resin layers are absorbed by a modified olefin resin layer so that the excellent vivid relectivity for a resin-coated metal sheet can be obtained.

14 Claims, 3 Drawing Sheets

RESIN-COATED METAL SHEET WITH HIGHER VIVID REFLECTIVITY HAVING THE EXCELLENT WORKABLE ADHESION STRENGTH

BACKGROUND OF THE INVENTION (1) Field of the Invention

The present invention relates to a resin-coated metal sheet with higher vivid reflectivity having the excellent workable adhesion strength, in particular, to a resin-coated metal sheet with higher vivid refelectivity having the excellent workable adhesion strength in which even if the resin-coated metal sheet is formed under the severe condition against the resin-coated metal sheet, for instance, by stretch-forming of the resin-coated metal sheet or by deep-drawing thereof, delamination does not occur so that the excellent workable adhesion strength is shown.

(2) Description of the Prior Art

Recently, decorative design of higher grade is being pursued, together with the grade of articles such as domestic electrical machinery and apparatus, audio, kitchen appliance, and interior finish materials being made higher. Decorative design of higher grade is expressed by the decorativeness of the surface of packing materials, in particular, the higher vivid reflectivity. Further, decorative design can be expressed by the shape of package which is formed by stretch-forming of the resin-coated metal sheet or by deep-drawing thereof. Accordingly, the requirement for a decorative steel sheet with higher vivid reflectivity having the workable adhesion strength fit for stretch-forming of the resin-coated metal sheet or by deep-drawing thereof is increasing.

In order to satisfy the requirement, various researches were made. For instance, there was proposed a method of laminating a colored metal sheet with a transparent thermosetting resin film or thermoplastic resin film of 5 to 100 $\mu$m and a thermoplastic resin film of 5 to 50 $\mu$m thickness having H to 7B hardness as disclosed in Japanese Patent Publication (Kokai) 55126 of 1991 (Heisei 2).

The vivid refelectivity can be obtained by the above-mentioned method. However, since delamination occurs in the interface between two resin component layers or the interface between laminated resin layer and colored metal sheet, the workable shape of the decorative metal sheet is limited.

Namely, in the prior art, it was extermely difficult to obtain a laminated metal sheet which has the workability fit for stretch-forming of the resin-coated metal sheet or by deep-drawing thereof and besides the vivid reflectivity.

It is an object of the present invention to provide a resin-coated metal sheet which has the workable adhesion strength fit for stretch-forming of the resin-coated metal sheet or by deep-drawing thereof, and the excellent vivid reflectivity.

DISCLOSURE OF THE INVENTION

A resin-coated metal sheet of the present invention comprises a metal sheet as a base sheet of which at least one surface is overlaid in sequential order from the base sheet side with a paint layer, a modified polyolefin resin layer of 5 to 100 $\mu$m thickness, a printed and/or solid colored print layer, namely a decorative layer, an adhesive layer and a transparent polyester resin film of 5 to 100 $\mu$m thickness.

Further, a resin-coated metal sheet of the present invention comprises a metal sheet as a base sheet of which at least one surface is overlaid in sequential order from the base sheet side with a paint layer, a decorative layer, a modified polyolefin resin layer of 5 to 100 $\mu$m thickness, an adhesive layer, and a transparent polyester resin film of 5 to 100 $\mu$m thickness.

Furthermore, a resin-coated metal sheet of the present invention comprises a metal sheet as a base sheet of which at least one surface is overlaid in sequential order from the base sheet side with a paint layer, a modified polyolefin resin layer of 5 to 100 $\mu$m thickness, an adhesive layer, and a transparent polyester resin film of 5 to 100 $\mu$m thickness.

In these resin-coated metal sheets of the present invention, the paint layer is preferably formed as a top coat layer of the transparent polyester resin film.

Further, in these resin-coated metal sheets of the present invention, the adhesive layer and/or the decorative layer desirably includes aluminium pigment or mica pigment.

[Action and Effect]

Since the modified polyolefin resin layer which is provided in between the transparent polyester resin film and the metal sheet has the excellent adhesiveness against the printing layer, the paint layer and the polyester resin film, even if the resin-coated metal sheet is formed under the severe condition against the resin-coated metal sheet, for instance by deep drawing, delamination does not occur so that the excellent workable adhesion strength is shown. Further, the roughness of the surface of the metal sheet, and unevenness of several component layers (resin layers) are absorbed by a modified polyolefin resin layer so that the excellent vivid reflectivity for a resin-coated metal sheet can be obtained.

Further, since the paint layer is formed as the top coat layer (what is called "top coat"or protective top layer) of the transparent polyester resin film, scratch resistance of the resin-coated metal sheet required when the resin-coated metal sheet is formed or handled can be improved.

PREFERRED EMBODIMENT

Then, embodiments of the present invention are explained in detail below.

Figure 1:
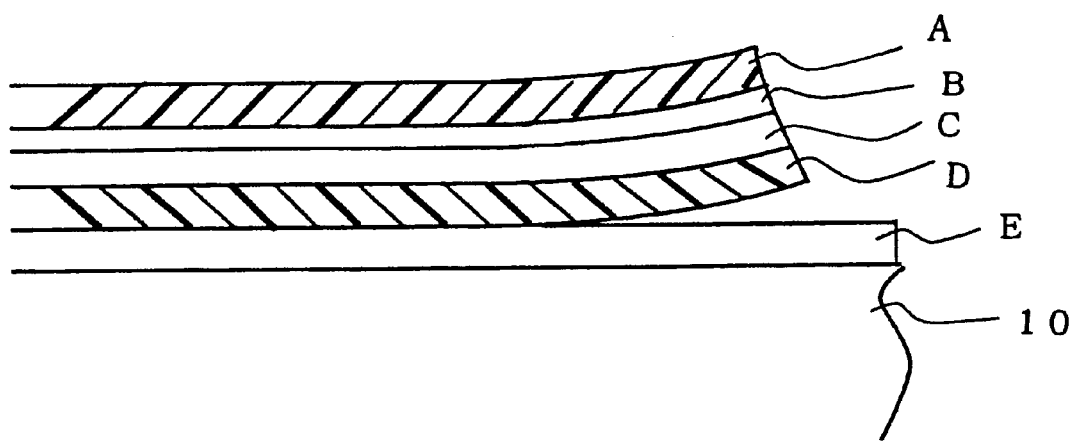
FIGS. 1 to 3 are sectional views showing the structure of one side of a resin-coated metal sheet according to the present invention.
Figure 2:
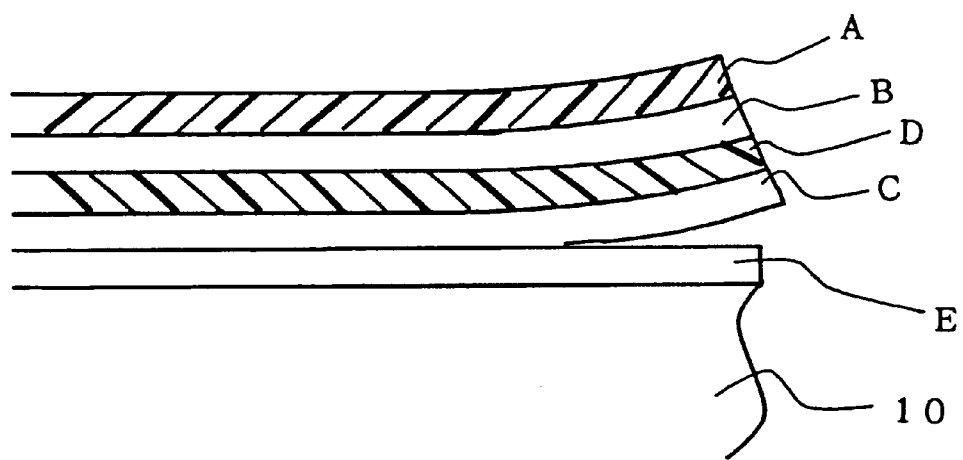
Figure 3:
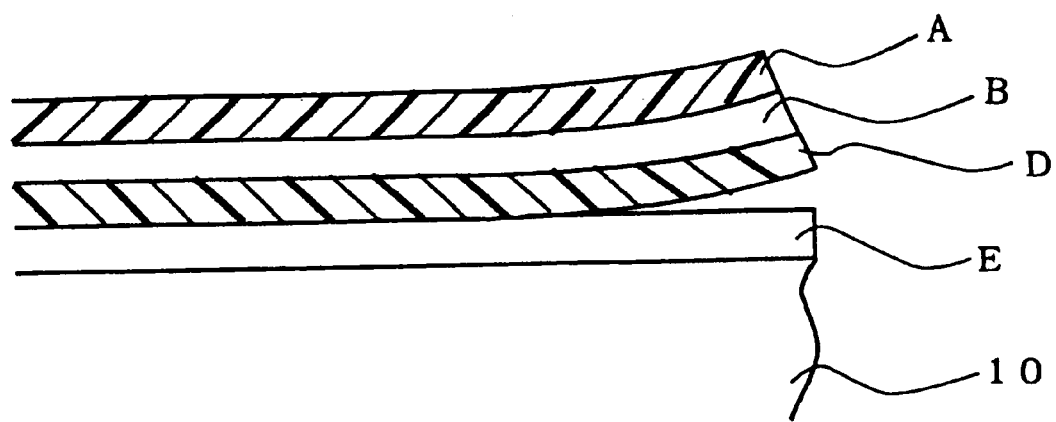

FIGS. 1 to 3 show the structures of one side of resin-coated metal sheets having resin coating layers formed on a metal sheet, respectively.

In the present invention, resin coating layers may be provided on both sides of a metal sheet, or only on one side of a metal sheet.

Then, the first embodiment of the present invention is explained in which resin coating layers are provided on one side of a metal sheet.

FIG. 1 corresponds to a resin-coated metal sheet in which "A" denotes a transparent polyester resin film, "B" denotes an adhesive layer, "C" a denotes decorative layer, "D" denotes a modified olefin resin layer, "E" denotes a paint layer, and "10" denotes the metal sheet.

In the embodiment of the present invention shown in FIG. 1, transparent polyester resin film A is 5 to 100 $\mu$m thick, which forms the outside layer of the resin-coated metal sheet. The thickness of transparent polyester resin film A is preferably 15 $\mu$m to 80 $\mu$m. When the thickness of transparent polyester resin film A is less than 5 $\mu$m, vivid reflectivity of the whole of the resin-coated metal sheet is inferior, and besides handling of transparent polyolefin resin film A in laminating is difficult. When the thickness of transparent polyester resin film A is more than 100 μm, the workable adhesion strength of the resin-coated metal sheet is inferior.

In order to improve scratch resistance of the resin-coated metal sheet in forming it or in handling it, transparent polyester resin film A is preferably coated with a top coat of thermosetting paint or ultraviolet irradiated resin paint such as silicone resin paint, fluoride resin paint, acrylic resin paint, melamine resin paint or urethane resin paint of 0.2 μm to 50 μm thickness, in which the thickness of the top coat is more preferably 0.5 μm to 30 μm. When the thickness of the top coat is less than 0.2 μm, the interference color is noticeably seen, and besides cut resistance is inferior. On the other hand, when the thickness of the top coat is more than 50 μm, the workability thereof decreases, and besides the economical efficiency is inferior.

Transparent polyester resin film A includes polyethylene terephthalate resin (PET) and copolymer thereof PET is a thermoplastic.

Adhesive layer B contains resin such as polyester resin, epoxy resin, acrylic resin, melamine resin or urethane resin.

Further, adhesive assistant having the adhesive effect such as γ-glycidoxypropyl trimethoxysilane (for instance, silane coupling agent made by Nippon Unicar Co., Ltd.) can be used as ingredient in addition to the above-mentioned resin. The thickness of adhesive layer B is preferably 0.1 μm to 50 μm, more preferably 0.5 μm to 30 μm. When the thickness of adhesive layer B is less than 0.1 μm, the boiling water resistance and the workable adhesion strength of the resin-coated metal sheet are inferior. On the other hand, when the thickness of the adhesive layer is more than 50 μm, disfiguring the external appearance of resin-coated metal sheet is caused by residual solvent which adhesive has when the laminate film is heated for laminating. Thereby, the vivid reflectivity of resin-coated metal sheet becomes inferior.

Adhesive layer B can contain pigment such as aluminium powder or mica powder too. In this case, the ratio of aluminium pigment to solid matter in adhesive is preferably 0.1% by weight to 30% by weight, more desirably 1% by weight to 20% by weight, because when the ratio of aluminium pigment to solid matter in adhesive is less than 0.1% by weight, metallic luster cannot be given, and when the ratio of aluminium pigment to solid matter in adhesive is more than 30% by weight, the adhesive layer becomes fragile and besides the vivid reflectivity of resin-coated metal sheet becomes inferior.

The particle of aluminium pigment has globelike shape or scalelike shape. The average particle size thereof is preferably 0.1 μm to 100 μm, more desirably 1 μm to 80 μm, in either globelike particles or scalelike particles, because when the average particle size is less than 0.1 μm, the decorativeness of resin-coated metal sheet is worsened, and when the average particle size is more than 100 μm, the vivid reflectivity of resin-coated metal sheet becomes bad.

The ratio of mica pigment to solid matter in adhesive is preferably about 0.1% by weight to 30% by weight, more desirably 1% by weight to 20% by weight, because when the ratio of mica pigment to solid matter in adhesive is less than 0.1% by weight, the metallic luster cannot be given, and when the ratio of mica pigment to solid matter in adhesive is more than 30% by weight, the adhesive layer becomes fragile.

The particle of mica pigment has globelike shape or scalelike shape. The average particle size thereof is preferably 0.1 μm to 100 μm, more preferably 1 μm to 80 μm, in either globelike particles or scalelike particles, because when the average particle size is less than 0.1 μm, the decorativeness of resin-coated metal sheet is worsened, and when the average particle size is more than 100 μm, the vivid reflectivity of resin-coated metal sheet is worsened.

Then, pattern or/and solid decorative layer C comprises a pattern printing layer and/or solid printing layer for giving the decorativeness to a resin-coated metal sheet. Resin for pattern or/and solid printing layer C includes polyester resin, epoxy resin, acrylic resin, melamine resin or urethane resin.

Polyester resin is particularly preferable, since when polyester resin is used, the workable adhesion strength of the resin-coated metal sheet is higher.

When the decorative layer is a pattern printing layer, the thickness of decorative layer is preferably 1 μm to 5 μm, because when the thickness of decorative layer is less than 1 μm, a printing pattern cannot come out well, and when the thickness of decorative layer is more than 5 μm, solvent of printing ink remains in the decorative layer C by which variations in the vivid reflectivity of resin-coated metal sheet are generated.

When the decorative layer C is a solid printing colored layer, the thickness of the decorative layer is preferably 1 μm to 5 μm, because when the thickness of the decorative layer is less than 1 μm, variations in coloring tone of the decorative layer are generated, and when the thickness of the decorative layer is more than 5 μm, variations in the vivid reflectivity of resin-coated metal sheet are generated, and besides it is not economical.

The printing layer can contain aluminium pigment or mica pigment too, in which the ratio of pigment to solid matter in printing ink is preferably 0.1% by weight to 30% by weight, more desirably 1% by weight to 20% by weight, in the same manner as the above-mentioned ratio of pigment to solid matter in the adhesive layer.

Modified polyolefin resin layer D is 5 μm to 100 μm thick, which is the essential element of the present invention for giving the excellent workable adhesion strength and the high vivid reflectivity to the resin-coated metal sheet.

The modified polyolefin resin is produced by blending propylene copolymer having a carboxyl group within a molecule with polypropylene in the following ratio: polypropylene copolymer 100 parts by weight to 20 parts by weight, and polypropylene 100 parts by weight to 0 parts by weight.

The thickness of modified polyolefin resin layer D is preferably 10 μm to 80 μm, more preferably 20 μm to 70 μm. When the thickness of modified polyolefin resin layer D is less than 5 μm, the vivid reflectivity of the whole of resin-coated metal sheet is lowered, and when the thickness of modified polyolefin resin layer D is more than 100 μm, the surface hardness and the workable adhesion strength of the whole of resin-coated metal sheet is lowered.

The modified polyolefin resin includes polyolefin polymer having at least one functional group selected from the group consisting of hydroxyl group, hydrolyzable group, carboxyl group, and acid anhydrous group within the molecule, or a mixture of the polyolefin polymer with other polyolefin polymer.

One or more kinds of pigment may be mixed in the modified polyolefin resin layer.

Further, it is preferable to apply an anchor coat on an upper side or a bottom side or both sides of the modified polyolefin resin layer by using silane coupling agent and others in order to improve adhesive strength of between resin layers.

The above mentioned transparent polyester resin film A, adhesive layer B, printing layer C and modified polyolefin resin layer D are totally called a "Laminate film"

Paint layer E shown in FIG. 1 is provided for forming a color layer which is directly formed on a metal sheet as a design. Resin for paint includes polyester resin, acrylic resin, urethane resin, epoxy resin or melamine resin as chief ingredients. It is preferable that polyester resin is used as chief ingredients in particular, because the workable adhesion strength is extremely good. The thickness of the paint layer is preferably 1 μm to 50 μm, more preferably 5 μm to 30 μm.

Further, paint layer E includes a paint layer formed of two or more layers. Namely, the paint layer E may include a laminate formed of plural layers having an under coating including rust preventing pigment. For instance, a first layer as an under coating layer may be formed of color paint, and a second layer laid on the under coating layer may be formed of clear paint. The metal sheet 10 as a base sheet shown in FIG. 1 includes steel sheets, stainless steel sheet, and surface treated steel sheets such as galvanized sheet iron, composite galvanized sheet iron, nickel-plated steel sheet and tin-free steel. Further the metal sheet 10 may include nonferrous metal sheets such as aluminium sheet and copper sheet.

The thickness of the metal sheet 10 is preferably 0.2 mm to 1.2 mm.

When one side of the metal sheet 10 is coated with resin, a bottom layer of the metal sheet 10 (namely, a side of the metal sheet 10 which is not coated with resin) is favorably coated with rust proofing paint of 0.1 μm to 50 μm thickness, and further the bottom layer is preferably coated with polyvinyl chloride for rust proofing. Paint resin including, as a principal component, resin such as polyester resin, acrylic resin, polyurethane resin, epoxy resin, or melamine resin is suitable.

FIG. 2 corresponds to an invention wherein "A" is a transparent polyester resin film, "B" is an adhesive layer, "C" is a pattern or/and solid printing layer, "D" is a modified olefin resin layer, "E" is a paint layer, and "10" is the metal sheet. This embodiment differs from the first embodiment shown in FIG. 1 in that pattern or/and solid decorative layer C and modified polyolefin resin layer D are exchanged with each other in an order of laminating.

Namely, in the resin-coated metal sheet as described shown in FIG. 2, decorative layer C is formed between paint layer E and modified polyolefin resin layer D. In this case, transparent modified polyolefin resin layer is used as modified polyolefin resin layer D so as to give vivid reflectivity to a design of decorative layer C formed thereunder so that pattern of decorative layer C can be seen from outside.

FIG. 3 corresponds to an invention, in which "A" is a transparent polyester resin film, "B" is an adhesive layer, "C" is a modified olefin resin layer, "D" is a paint layer, and "10" is the metal sheet.

This embodiment differs from the second embodiment of FIG. 2 in that decorative layer C does not exist in the laminate film. In this case, the appearance of paint layer D can be observed from above of transparent polyester resin film A.

A Method of Producing a Resin-coated Metal Sheet
(1) Production of painted steel sheet Coating of galvanized sheet iron with resin paint is made by roll coating one time or two times, in which when the thickness of paint layer is needed to be increased, further times of painting is increased.

(2) Production of a laminate film

An instance of production of a laminate film shown in FIG. 1 is explained below.

First, adhesive is painted on polyester resin film by roll coating to form an adhesive layer on the polyester film. After drying, a pattern is printed on the adhesive layer. Further according to demand, solid printing is made thereon. Or there is a case where pattern printing is omitted and only solid printing is made. Modified polypropylene resin layer is formed over the printing layer by extrusion coating to form a laminate film.

(3) Overlay

After the painted steel sheet was heated, the painted steel sheet is overlaid by the laminate film by means of laminating roll, and then the painted steel sheet overlaid by a laminate film is further heated, and pressed by means of a mirror roll. Thereafter the painted steel sheet overlaid by the laminate film is cooled. In this time, the suitable roll pressure of the laminating roll is 1 kg/cm$^2$ to 80 kg/cm$^2$, and more desirably 5 kg/cm$^2$ to 60 kg/cm$^2$. When the roll pressure is less than 1 kg/cm$^2$, the laminate film cannot be brought into close contact with the painted steel sheet uniformly over the width of the painted steel sheet so that the variations in the apprearance (vivid reflectivity) can be found. On the other hand, when the roll pressure is more than 80 kg/cm$^2$, the abrasion of the roll occurs heavily so that the exchange of laminating roll should be made frequently, therefore, the productivity being decreased.

EXAMPLE 1
(Production of Painted Steel Sheet)

Polyester copolymer paint including white pigment was painted on Galvanized sheet iron having 0.5 mm thickness, 10 g/m$^2$ galvanizing amount, 0.05 mg/dm$^2$ chromate film layer (as amount of chromium) and average surface roughness Ra of 0.3 μm, with thickness 15 μm and made thermoset to form a painted steel sheet.

(Production of a Laminate Film)

Polyester resin adhesive was painted on a transparent polyethylene terephthalate film of 25 μm thickness which was previousely top-coated with polyester resin of 5 μm thickness (film-protective layer), with thickness 1 μm, and then a grain pattern was printed thereon by using polyester resin ink, with thickness 1 μm. Thereafter, transparent modified polypropylene resin layer (consisting of a mixture of 100 parts by weight of polypropylene copolymer with 100 parts by weight of polypropylene) of 20 μm thickness was formed on the printed side of the polyethylene terephthalate film by extrusion coating to form a laminate film.

(Overlay)

The painted steel sheet was overlaid by the laminate film in an atmosphere of 200° C., under the roll pressure of 20 kg/cm$^2$.

As a result, the numerical value indicating the vivid reflectivity of the resin-coated metal sheet was 0.8 and good, and workable adhesion strength thereof was excellent.

Comparative Example 1

A painted steel sheet was produced in the same manner as in Example 1, and then overlaid by the following laminate film. Namely, polyester resin adhesive was painted on transparent polyethylene terephthalate film of 25 μm thickness, with thickess 1 μm, and then a grain pattern was printed on the adhesive layer, with thickness 1 μm by using polyester resin ink to form a laminate film.

Then, the painted steel sheet was overlaid by the laminate film to form a resin-coated metal sheet in the same manner as in Example 1. As a result, the workable adhesion strength of the resin-coated metal sheet was good, however the numerical value indicating the vivid reflectivity thereof was 0.1, bad and poor.

EXAMPLE 2

A painted steel sheet produced in the same manner as in Example 1, and then overlaid by the following laminate film. Namely, polyester resin adhesive was painted on one side of transparent polyethylene terephthalate film of 100 μm thickness, with thickness 5 μm. Then transparent modified propylene resin layer of 100 μm thickness was formed on the painted side of the polyethylene terephthalate by extrusion coating. And then the grain pattern printing and the solid pattern printing ere made in order on the modified propylene resin layer with each thickness 5 μm by using polyester resin ink to form a laminate film.

Then, the painted steel sheet used in Example 1 overlaid by the laminate film in an atmosphere of 200° C. under the roll pressure of 20 kg/cm$^2$, by which a resin-coated metal sheet having the vivid reflectivity was formed. This resin-coated metal sheet had the vivid reflectivity of 1.0 and the excellent workable adhesion strength.

Comparative Example 2

A painted steel sheet was produced in the same manner as in Example 1, and then overlaid by the following laminate film. Namely, polyester resin adhesive was painted on a transparent polyethylene terephthalate film of 100 μm thickness, with thicness 5 μm. Then, a transparent polypropylene resin layer of 100 μm thickness was formed on the polyethylene terephthalate film by extrusion coating. Then the grain pattern printing and the solid printing were made in order on the propylene resin layer, with each thickness 5 μm, by using polyester resin ink to form a laminate film.

Then the painted steel sheet was overlaid by the laminate film in the same manner as in Example 1 to form a resin-coated metal sheet. As a result, the numerical value of the vivid reflectivity of the resin-coated metal sheet was 0.8 and good. However, the workable adhesion strength thereof was bad and poor.

EXAMPLE 3

A painted metal sheet was produced in the same manner as in Example 1, and then overlaid by the following film. Namely, silane coupling agent was painted on one side of a transparent polyethylene terephthalate film of 12 μm thickness, with thickness 0.5 μm, and then solid printing was made thereon by polyester resin ink including mica pigment, with thickness 4 μm. Then, transparent modified polypropylene resin layer of 5 μm thickness was formed on the printed side of the polyethylene terephthalate film by extrusion coating to form a laminate film.

Then, a painted steel sheet used in Example 1 was overlaid in an atmosphere of 200° C., under the roll pressure of 20 kg/cm$^2$ to form a resin-coated metal sheet having the vivid reflectivity. As a result, the numerical value indicating the vivid reflectivity of the resin-coated metal sheet was 0.7, and the workable adhesion strength thereof was excellent.

Comparative Example 3

A painted steel sheet was produced in the same manner as in Example 1, and overlaid by the following laminate film. Namely, silane coupling agent was painted on one side of a transparent polyethylene terephthalate film of 12 μm thickness, with thickness 0.5 μm. Then, solid printing was made thereon by using polyester resin ink including mica pigment, with thickness 4 μm. Transparent propylene resin layer of 5 μm thickness is formed on the printed side of the polyethylene terephthalate film by exrusion coating to form a laminate film.

Then the painted steel sheet was overlaid by the laminate film in the same manner as in Example 1 to form a resin-coated metal sheet. As a result, the numerical value indicating the vivid reflectivity of the resin-coated metal sheet was 0.7, and good. However, the workable adhesion strength was bad and poor.

EXAMPLE 4

A painted steel sheet was produced in the same manner as in Example 1, and then overlaid by the following laminate film. Namely, Polyester resin adhesive including aluminium pigment was painted on one side of a transparent polyethylene terephthalate film of 50 μm thickness, with thickness 50 μm.

Then transparent modified polypropylene resin of 50 μm thickness was formed thereon by extrusion coating to form a laminate film.

Then, the painted steel sheet used in Example 1 was overlaid by the laminate film in an atmosphere of 200° C., under the roll pressure of 20 kg/cm$^2$ to form a resin-coated metal sheet with vivid refelectivity. The numerical value indicating the vivid reflectivity of the resin-coated metal sheet was 0.7, and the workable adhesion strength was excellent.

Comparative Example 4

A painted steel sheet was produced in the same matter as in Example 1, and then overlaid by the following laminate film. Namely. polyester resin adhesive including aluminium pigment was painted on one side of a transparent polyethylene terephthalate film of 50 μm thickness, with thickness 50 μm. Then, a transparent polypropylene resin layer of 50 μm thickness was formed thereon by extrusion coating to form a laminate film.

Then, the painted steel sheet was overlaid by the laminate film in the same manner as in Example 1 to form a resin-coated metal sheet. As a result, the numerical value indicating the vivid reflectivity of the resin-coated metal sheet was 0.7 and good. However the workable adhesion strength thereof was bad and poor.

(Method of Valuation)

(Vivid Reflectivity)

The vivid reflectivity of the resin-coated metal sheet of the present invention was measured by the following method. Namely, the vivid reflectivity of reflected image, namely the vivid reflectivity of normal reflected image on decorative surface of resin-coated metal sheet was measured by means of a portable distinctness of image glossmeter PGD-4 type (made by Japan Color Research Institute). The higher the measured value is, the higher the vivid reflectivity is.

A method of measurement was as follows. Namely, a resin-coated metal sheet of 10 cm×10 cm was pushed against the glossmeter horizontally, and scale of the glossmeter was read with naked eyes as the vivid reflectivity.

(Workable Adhesion Strength)

In the present invention, valuation of workable adhesion strength was made by taking the following two measurements and judging the results thereof synthetically.

(1) Erichsen test

Checkered cuts reaching a base metal are made in a resin-coated surface of resin-coated metal sheet by a cutter knife, and 8 mm stretch-forming of the resin-coated metal sheet was made from the backside of the resin-coated metal sheet by Erichsen tester. Thereafter, the extent of delamination was valuated by heating continuously the resin-coated metal sheet at 100° C. for one hour and thereafter observing the existing of delamination. In Table No. 1, the mark "⊙" designates "no delamination", and the mark "X" designates "delamination".

(2) Cup-deep drawing test

Deep drawing of a resin-coated metal sheet into a cup was made by Yamada-way deep drawing tester, with drawing ratio r=2.2. Checkered cuts reaching a base metal were made in a resin surface of the resin-coated metal sheet formed into a cylindrical part of cup, with a space of 5 mm. Thereafter, the extent of delamination was valuated by heating continuously the resin-coated metal sheet formed into a cup by deep drawing and thereafter observing the existing of delamination. In Table 1, the mark "⊙" designates "no delamination", and the mark "X" designates "delamination".

Effect of the Invention

As apparent from Table 1 and 2, since modified polyolefin resin layer included in a laminate film has excellent adhesion strength with printing layer, paint layer, polyester resin film and others, even if severe work such as deep drawing is made, delamination between layers does not occur. Therefore, resin-coated metal sheet of the present invention has the excellent workable adhesion strength. Further, since surface roughness and convex and concave parts of each layer (resin layer) are absorbed by modified polyolefin resin layer, resin-coated metal sheet of the present invention has the excellent vivid reflectivity for resin-coated metal sheet.

TABLE 1

| | Painted steel sheet | | The composition of a laminate film | | | | | Workable adhesion strength | |
|---|---|---|---|---|---|---|---|---|---|
| | Metal sheet | Color paint layer E | Polyolefin resin layer D | Printing layer C | Adhesive layer B | Transparent polyester resin film A | Value of vivid reflectivity | Erichsen test | Cup-deep drawing test |
| Example 1 | Galvanized sheet iron 0.5 mm thickness | Polyester copolymer inc. white pigment 15 μm | Transparent modified polypropylene resin 20 μm | Polyester ink grain printing 1 μm | Polyester resin 1 μm | Transparent polyethylene terephthalate film 25 μm | 0.8 | ⊙ | ⊙ |
| Comparison 1 | Galvanized sheet iron 0.5 mm thickness | Polyester copolymer inc. white pigment 15 μm | — | Polyester ink grain printing 1 μm | Polyester resin 1 μm | Transparent polyethylene terephthalate film 25 μm | 0.1 | ⊙ | ⊙ |
| Example 2 | Galvanized sheet iron 1.0 mm thickness | Polyester copolymer inc. white pigment 20 μm | Transparent modified polypropylene resin 100 μm | Polyester ink grain + solid printing 10 μm | Polyester resin 5 μm | Transparent polyethylene terephthalate film 100 μm | 1.0 | ⊙ | ⊙ |
| Comparison 2 | Galvanized sheet iron 1.0 mm thickness | Polyester copolymer inc. white pigment 20 μm | Transparent polypropylene resin 100 μm | Polyester ink grain + solid printing 10 μm | Polyester resin 5 μm | Transparent polyethylene terephthalate film 100 μm | 0.8 | X | X |
| Example 3 | Tin-free steel 0.3 mm thickness | Polyester copolymer inc. white pigwent 5 μm | Transparent modified polypropylene resin 5 μm | Polyester ink solid printing inc. mica pigment 4 μm | Silane coupling agent 0.5 μm | Transparent polyethylene terephthalate film 12 μm | 0.7 | ⊙ | ⊙ |
| Comparison 3 | Tin-free steel 0.3 mm thickness | Polyester copolymer inc. white pigment 5 μm | Tarnsparent polypropylene resin 5 μm | Polyester ink solid printing inc. mica pigment 4 μm | Silane coupling agent 0.5 μm | Transparent polyethylene terephthalate film 12 μm | 0.7 | X | X |

TABLE 2

| | Painted steel sheet | | The composition of laminate film | | | | | Workable adhesion strength | |
|---|---|---|---|---|---|---|---|---|---|
| | Metal sheet | Color paint layer E | Polyolefin resin layer D | Printing layer C | Adhesive layer B | Transparent polyester resin film A | Value of vivid reflectivity | Erichsen test | Cup-deep drawing test |
| Example 4 | Stainless steel sheet 0.5 mm thickness | Epoxy resin inc. light brown 30 μm | Modified polypropylene resin 50 μm | — | Polyester resin inc. Al pigment 50 μm | Transparent polyethylene terephthalate film 50 μm | 0.7 | ⊙ | ⊙ |
| Comparison 4 | Stainless steel sheet 0.5 mm thickness | Epoxy resin inc. light brown 30 μm | Transparent polypropylene 50 μm | — | Polyester resin inc. Al pigment 50 μm | Transparent polyethylene terephthalate film 50 μm | 0.7 | X | X |

What is claimed is:

1. A resin-coated metal sheet consisting essentially of a metal sheet as a base sheet of which at least one surface thereof is overlaid in sequential order from the base sheet surface with a paint layer, a modified polyolefin resin layer of 5 to 100 μm thickness, a decorative layer, wherein said decorative layer comprises at least one of a solid or a pattern, an adhesive layer and a transparent polyester resin film of 5 to 100 μm thickness.

2. A resin-coated metal sheet as claimed in claim 1, wherein the adhesive layer includes aluminium pigment.

3. A resin-coated metal sheet as claimed in claim 1, wherein the decorative layer includes aluminium pigment.

4. A resin-coated metal sheet as claimed in claim 1, wherein the decorative layer includes mica pigment.

5. A resin-coated metal sheet as claimed in claim 1, wherein a resin coating layer is formed as a protective top coat layer of the transparent polyester resin film.

6. A resin-coated metal sheet as claimed in claim 1, wherein the adhesive layer includes mica pigment.

7. The resin-coated metal sheet of claim 1, wherein said modified polyolefin resin layer, said decorative layer, said adhesive layer and said transparent polyester resin film together comprise a laminate film.

8. A resin-coated metal sheet consisting essentially of a metal sheet as a base sheet of which at least one surface thereof is overlaid in sequential order from the base sheet surface with a paint layer, a decorative layer, wherein said decorative layer comprises at least one of a solid or a pattern, a modified polyolefin resin layer of 5 to 100 μm thickness, an adhesive layer, and a transparent polyester resin film of 5 to 100 μm thickness.

9. A resin-coated metal sheet as claimed in claim 8, wherein a resin coating layer is formed as a protective top coat layer of the transparent polyester resin film.

10. A resin-coated metal sheet as claimed in claim 8, wherein the adhesive layer includes aluminum pigment.

11. A resin-coated metal sheet as claimed in claim 8, wherein the paint layer includes aluminum pigment.

12. A resin-coated metal sheet as claimed in claim 8, wherein the adhesive layer includes mica pigment.

13. A resin-coated metal sheet as claimed in claim 8, wherein the decorative layer includes mica pigment.

14. The resin-coated metal sheet of claim 8, wherein said decorative layer, said polyolefin resin layer, said adhesive layer and said transparent polyester resin film together comprise a laminate film, wherein said decorative layer comprises at least one of a solid or a pattern.

* * * * *